UNITED STATES PATENT OFFICE.

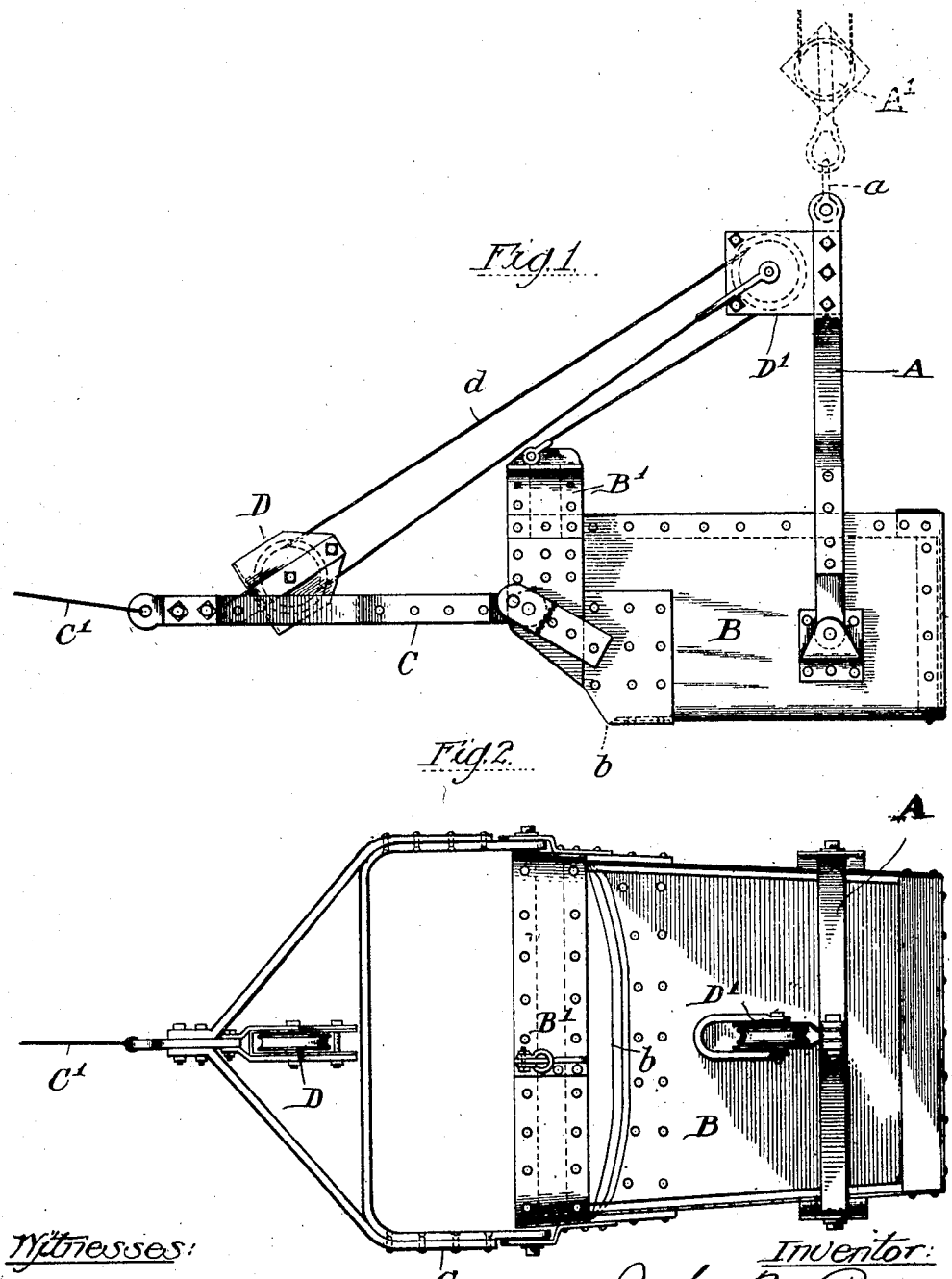

JOHN W. PAGE, OF CHICAGO, ILLINOIS.

EXCAVATING-SHOVEL.

No. 916,772.      Specification of Letters Patent.      Patented March 30, 1909.

Application filed December 9, 1905. Serial No. 291,013.

*To all whom it may concern:*

Be it known that I, JOHN W. PAGE, a citizen of the United States of America, residing at Chicago, in the county of Cook and State of Illinois, have invented certain new and useful Improvements in Excavating-Shovels, of which the following is a specification.

My invention relates to improvements in excavating shovels and is fully described and explained in this specification and shown in the accompanying drawings, in which—

Figure 1 is a side elevation of my improved device, and Fig. 2 is a top plan of the same.

The excavating shovel herein shown is an improvement on the shovel shown in my Patent No. 758,380, granted April 26, 1904, and the particular features of difference between this shovel and the shovel of said patent will be particularly pointed out herein.

Referring to the drawings, A, is a suitable supporting bail which is provided at its upper end with an eye, $a$, for the attachment of a block, $A^1$, by which the shovel can be lifted.

B, indicates the shovel proper which is pivotally secured to the bail, A, said bail being bifurcated to straddle the shovel and the point of pivotal connection between the bail and shovel being behind the center of gravity of the shovel, so that when released the shovel will swing down and dump its contents as is particularly set forth in the patent referred to. The shovel has at its front lower corner a cutting edge, $b$, and above and slightly in front of this cutting edge is pivotally secured a hauling-bail, C, which performs the same function as the two small hauling-ropes of my patent. This hauling-bail, C, is connected at its forward end to a hauling-rope, $C^1$.

Two blocks, D, $D^1$, are secured respectively to the bails, A, C, near their centers, and over these bails runs a holding-rope, $d$, one end of which is secured to the block, $D^1$, on the bail, A, and the other end of which is secured to a cross-piece, $B^1$, on the front of the shovel. The arrangement of the rope and blocks is such that the cross-piece, $B^1$, will move twice as far as the block, D.

In general my shovel works the same as the shovel of my patent referred to, each one of the parts doing all that the corresponding part in the shovel of said patent does. Thus when it is desired to excavate with my shovel, the hauling-rope, $C^1$, can be drawn in by a suitable engine, and the shovel will fill itself with earth in the ordinary way. Thereupon, the shovel can be raised by a derrick if desired and it will be maintained in a horizontal position as long as tension is maintained on the hauling-rope, $C^1$. When the shovel and the hauling-rope are substantially in line the horizontal position of the shovel is maintained simply by this horizontal pull. As soon, however, as the shovel is above the horizontal line of the hauling-rope it is held up by means of the holding-rope, $d$, which is kept under tension by the hauling-rope. As soon as the tension on the hauling-rope is released therefore, regardless of which position the shovel is in, both means for holding the shovel are released and its own weight swings it down, so as to dump its contents. In constructing shovels of this type, it is often desirable, for the sake of greater strength, to use a rigid hauling bail in place of the short hauling ropes of my prior patent. When such a rigid bail is used, unless it be made very long, the shovel proper will not reach a vertical position when released. When digging in very sticky earth, it is occasionally necessary to bring the shovel to an almost perfect vertical line to dump the contents and, under such circumstances, I increase the angle which the shovel takes when released, by means of the two blocks, D, $D^1$, and the rope, $d$. It will be seen that as the block, D, rises a given distance, twice as much rope is paid out, so that the front end of the shovel falls twice as fast as in the shovel of my patent, and, consequently reaches a steeper angle.

The efficiency of the shovel as an excavator is increased in my present device by pivoting the hauling-bail to it above the cutting edge and slightly in front of the same, so that when the shovel is operating in comparatively hard earth it tends to rise up about the cutting edge as a pivot and operates much as an ordinary spade under the foot of the user. Furthermore, when the cutting edge of the shovel strikes an obstruction, the utmost possible swing which it can make about the cutting edge as a pivot, only brings it to the point where the cutting edge, the pivot of the hauling-bail upon the shovel and the hauling-rope and bail, are in the same straight line. Practically the weight of the shovel will tend to keep the pivot of the bail on the shovel above the line connecting the cutting edge with the rope, but even if the theoretical position were reached, my present shovel could not tip over. With the shovel of my prior patent, if the front edge strikes an obstruction, the entire shovel may be turned completely over about the cutting edge as a pivot. It will be seen that by varying the angle between the cutting edge and the pivot of the bail, the angle which the shovel will take when an obstruction is encountered can be altered at will. In practice, I find that the angle illustrated in the drawings, i. e. with the pivot above and in front of the cutting edge at an angle of about 40° from the vertical, gives the shovel proper inclination to do most efficient excavation.

I realize that considerable variation is possible in the details of this construction without departing from the spirit of my invention, and I do not intend, therefore, to limit myself to the specific form herein shown and described.

I claim as new and desire to secure by Letters Patent:—

1. In a device of the class described, the combination with a shovel, of a supporting member pivoted thereto behind the center of gravity thereof, a cutting edge on the front of the shovel, hauling means attached to the shovel above and in front of the cutting edge, a holding-rope extending upward from said shovel and means for maintaining continuous tension on one or the other of said devices.

2. The combination with a shovel, of a supporting device pivoted thereto behind the center of gravity thereof, a cutting edge at the front of the shovel, hauling means pivoted to the shovel above and in front of the cutting edge, a block on the supporting device and a holding-rope running from the front of said shovel over said block to the hauling means.

3. In a device of the class described, the combination with a suitable shovel, of a supporting device pivoted thereto behind the center of gravity thereof, hauling means pivotally secured to the front of the shovel, blocks on the hauling means and the supporting device, and a rope running over said blocks and secured to the front of the shovel whereby the front of the shovel falls more rapidly than the block on the hauling means rises.

4. The combination of a shovel having a cutting edge at its front end, a supporting bail pivoted outside the center of gravity of the shovel, a rigid hauling bail pivotally attached to the shovel near its front end and connecting means between the supporting and hauling bails whereby, while the shovel is suspended, tension on the draft bail holds said shovel horizontally.

In witness whereof I have signed the above application for Letters Patent at Chicago, in the county of Cook and State of Illinois, this 5th day of December A. D. 1905.

JOHN W. PAGE.

Witnesses:
   CHAS. O. SHERVEY,
   K. M. CORNWALL.